US012658330B2

(12) United States Patent
Stansbury et al.

(10) Patent No.: US 12,658,330 B2
(45) Date of Patent: Jun. 16, 2026

(54) FUEL ASSEMBLY HAVING A SHARED FISSION GAS PLENUM

(71) Applicant: Westinghouse Electric Company LLC, Cranberry Township, PA (US)

(72) Inventors: Cory A. Stansbury, Gorham, ME (US); David L. Stucker, Chapin, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 94 days.

(21) Appl. No.: 17/594,819

(22) PCT Filed: Apr. 27, 2020

(86) PCT No.: PCT/US2020/030098
§ 371 (c)(1),
(2) Date: Oct. 29, 2021

(87) PCT Pub. No.: WO2020/223163
PCT Pub. Date: Nov. 5, 2020

(65) Prior Publication Data

US 2022/0215972 A1 Jul. 7, 2022

Related U.S. Application Data

(60) Provisional application No. 62/840,775, filed on Apr. 30, 2019.

(51) Int. Cl.
*G21C 3/32* (2006.01)
*G21C 1/03* (2006.01)

(52) U.S. Cl.
CPC ............. *G21C 3/3213* (2013.01); *G21C 1/03* (2013.01)

(58) Field of Classification Search
CPC ......... G21C 3/041; G21C 3/17; G21C 3/3213
(Continued)

(56) References Cited

U.S. PATENT DOCUMENTS 3,205,144 A 9/1965 Jabsen
3,238,105 A * 3/1966 Mcnelly .................. G21C 1/02
376/172

(Continued)

FOREIGN PATENT DOCUMENTS

CN 106952670 A 7/2017
GB 2163888 A 3/1986

(Continued)

OTHER PUBLICATIONS

International Search Report and Written Opinion for International PCT Application No. PCT/US2020/030098, dated Nov. 23, 2020.

*Primary Examiner* — Jinney Kil
(74) *Attorney, Agent, or Firm* — K&L Gates LLP

(57) ABSTRACT

A fuel assembly for use in a nuclear reactor comprising a fuel bundle, a plenum header connection positioned on the fuel bundle, a mast extending from the fuel bundle, and a common fission gas plenum extending from the mast is disclosed. The reactor includes a vessel and coolant situated within the vessel. The fuel bundle comprises a plurality of fuel elements including nuclear fuel material positioned therein. The plenum header connection comprises a plurality of passageways defined therein that are in fluid communication with the nuclear fuel material. The elongate mast comprises an internal passage connecting the common fission gas plenum to the plurality of passageways of the plenum header connection such that the common fission gas plenum is configured to receive an amount of fission gas generated by the nuclear fuel material during operation. The common fission gas plenum is positioned in an otherwise unused portion of the vessel.

21 Claims, 9 Drawing Sheets

(58) Field of Classification Search
USPC .................................................. 376/418, 456
See application file for complete search history.

(56) References Cited

U.S. PATENT DOCUMENTS

| | | | | | |
|---|---|---|---|---|---|
| 3,357,893 | A * | 12/1967 | Gatley | G21C 3/04 376/418 |
| 3,432,388 | A * | 3/1969 | Fortescue | G21C 5/06 976/DIG. 102 |
| 3,743,576 | A * | 7/1973 | Fortescue | G21C 3/041 376/440 |
| 3,957,575 | A | 5/1976 | Fauth, Jr. et al. | |
| 4,077,839 | A * | 3/1978 | Peehs | G21C 3/3213 376/451 |
| 4,130,460 | A * | 12/1978 | Iljunin | G21C 3/322 376/418 |
| 4,189,348 | A * | 2/1980 | Donck | G21C 3/3213 376/451 |
| 5,303,275 | A * | 4/1994 | Kobsa | G21C 15/24 376/281 |
| 8,817,942 | B2 * | 8/2014 | Cinotti | G21C 1/03 376/327 |
| 2011/0051876 | A1 * | 3/2011 | Ahlfeld | G21C 17/10 376/253 |

FOREIGN PATENT DOCUMENTS

| | | | |
|---|---|---|---|
| JP | H02198389 | A | 8/1990 |
| JP | H10238407 | A | 9/1998 |
| WO | 2011025552 | A1 | 3/2011 |
| WO | 2020223163 | A2 | 11/2020 |

* cited by examiner

FUEL ASSEMBLY HAVING A SHARED FISSION GAS PLENUM

CROSS-REFERENCE TO RELATED APPLICATIONS

This application is a U.S. National Stage Entry under 35 U.S.C. § 371 of International Patent Application No. PCT/US2020/030098, entitled COMMON PLENUM FUEL ASSEMBLY DESIGN SUPPORTING A COMPACT VESSEL, LONG-LIFE CORES, AND EASED REFUELING IN POOL-TYPE REACTORS, filed Apr. 27, 2020, which claims benefit under 35 U.S.C. § 119(e) to U.S. Provisional Patent Application Ser. No. 62/840,775, entitled COMMON PLENUM FUELASSEMBLY DESIGN SUPPORTING A COMPACT VESSEL, LONG-LIFE CORES, AND EASED REFUELING IN POOL-TYPE REACTORS, filed Apr. 30, 2019, the entire disclosures of which are hereby incorporated by reference herein.

BACKGROUND

The challenges of refueling a liquid metal-cooled (or salt-cooled in the future) reactor are notably higher than those in a light water reactor. This suggests that benefits may be realized through harnessing long intervals between refueling. Certain fast reactors are capable of utilizing unique fuel cycles, offering very high energy cores, significant breeding, and permitting feedstocks of U:Pu, Pu+U:Pu, U:Th, and U+MinorActinides:Pu; where X:Y describes the Seed Element(s):Blanket Bred Material. However, one of the primary limitations to harnessing high-breeding ratio/high-energy cores is the relatively small volume of fission gas plenum per linear unit of plenum length. Current art responds to this requirement by implementing extraordinarily long fuel rod plenums or claddings, potentially longer than the active fuel length, in order to accommodate the worst-case fission gas in the most-limiting pin. Integrated fission gas release, and the resulting high rod internal pressure, occurs at high fuel exposure when the cladding has experienced embrittlement and swelling caused by neutron damage which is measured as displacement per atom (dpa). The combination of cladding swelling/embrittlement and high cladding stress from the high internal pressure often establishes the maximum permitted fuel exposure (i.e., core residence time), thereby dictating the levelized fuel cycle cost and challenging the ability to obtain a positive business case that harnesses the advantages of fast reactors.

SUMMARY

At least one aspect of the present disclosure, targets maximizing fuel exposure and thereby simplifying refueling through multiple means, thus adding simplicity and driving cost out of the plant. These improvements and their implementation are discussed in greater detail below.

A common fission gas plenum or tank is connected to, and is located above a collection header or upper end fitting positioned above a fuel bundle. The location of the common fission gas plenum above the upper end fitting is above the core and the reactor flow region, which allows substantially larger plenum volume per length of plenum than is possible within the reactor flow region or in other shared plenum designs. This is because the common fission gas plenum is located in previously-unused reactor vessel space, thus permitting a larger size common fission gas plenum without penalty, and (relative to conventional, fuel rod plenums) most of what would be the bundle flow area is available for plenum volume. Further, the amount of structural material for the common fission gas plenum is much less than what would be required for the current art of individual fuel rod plenums.

The upper end fitting or collection header comprises channels or passageways that collect fission gasses emitted from the fuel bundle and directs the fission gases into a reduced diameter mast positioned above the upper end fitting. The fission gases travel through a passageway in the reduced diameter mast and into the common fission gas plenum positioned above the reduced diameter mast. The passageways between the upper end fitting and the common fission gas plenum in which the fission gases travel after exiting the fuel bundle can be considered to define a fission gas collection volume. The common plenum equalizes the individual fuel fission gas release such that the fuel assembly limiting condition need not be defined by the peak pin operating at the maximum power at the most limiting set of manufacturing and design uncertainties; but rather to the fuel rod bundle average values, with much lower uncertainties in the rod internal pressure and the fuel rod's ability to store volatile fission products. (Note: subsequent references to fission products or fission gas refers to volatile fission products only).

Each fuel rod is connected to the common fission gas plenum through connections provided within the upper end fitting. Each rod may have a one-way valve or fluidic diode to prevent backflow from the plenum, should a rod leak develop.

The common fission gas plenum eliminates the need for plenum space within the rod, thus minimizing the fuel rod length, potentially by up to a factor of six, or more. This permits shorter bundle lengths with longer fuel stacks, enabling greater fuel load relative to designs employing a conventional fission gas plenum within the rods and a consequently longer fuel cycle.

Further to the above, FIG. 1A illustrates a graphical representation depicting the ratio of common fission gas plenum volume in accordance with at least one aspect of the present disclosure and rodded plenum volumes at different pitch to diameter ratios. This comparison is depicted for the Westinghouse LFR and a historical (operated) liquid metal fast reactor.

Further to the above, the fuel mast and the common fission gas plenum would penetrate the surface of the coolant, thus allowing direct handling of the fuel, and further provide easy hold-down through a downward vertical retention force (see arrow DF in FIG. 6) applied to the structure of the fuel assembly to keep the majority of the fuel assembly, including most-notably the active fuel portion, situated within the coolant and resisting the buoyant, frictional, and form drag force of the coolant on the fuel assembly. In at least one embodiment, the fuel mast and the common fission gas plenum may approach the surface of the coolant (e.g., without penetrating the surface). In such an arrangement, easier handling of the fuel may be realized without the fuel mast and/or common fission gas plenum penetrating the surface of the coolant.

At least one aspect of the present disclosure results in a reduced fuel power density for a given reactor vessel size and thermal power rating. Additionally, at least one aspect of the present disclosure reduces refueling time pressure (e.g., due to a longer fuel cycle and corresponding reduction in overall capacity factor impacts from refueling duration). Reducing refueling time pressure may facilitate dry-lift refueling. Dry-lift refueling is typically constrained by the need to ensure fuel rod integrity during transit from the primary coolant pool to the used fuel storage area or cask. The reduced fuel power density and much larger available fission gas storage volume enables significant increases in fuel burnup and breeding ratios by reducing the rate of fission gas pressure with increasing fuel integrated fissions before the structural limitations of high fuel rod pressures occur. The reduced fuel power density and much larger available fission gas storage volume may enable a longer fuel cycle.

At least one aspect of the present disclosure is intended to lower the stresses on the fuel rod cladding to facilitate implementation of ultra-long fuel cycles, resulting in reduced need for used fuel handling infrastructure within the plant and, thus, reduced concerns on potential diversion of used fuel during refueling operation. These advantages particularly apply to reactors in countries lacking mature fuel cycle infrastructure/safeguards.

At least one aspect of the present disclosure is intended to lower reactor fission product neutron parasitic absorption as a result of enabling relocating of gaseous and volatile absorbing fission products far away from the important high neutron flux reactor region (e.g., relocation to the common fission gas plenum).

Further to the above, an option for in-vessel spent fuel storage, which would more severely penalize reactor vessel height should it be implemented with conventional, longer fuel rod designs, would include a point along the mast's smaller diameter gas transport path where a cut and pinch methodology is implemented in order to separate the common fission gas plenum from the fuel assemblies and, thus, sealing both ends of the fission gas transport tube in the reduced diameter mast. This would enable each elongate fuel assembly to be transformed into a pair of relatively shorter elongate structures that would be relatively easier to store than a single longer structure. Also, in such an arrangement, the two parts of the elongate fuel assembly could be stored or processed in ways appropriate to their requirements versus forcing storage in one container, or cask, which is designed for depleted fuel but would arguably be overdesigned for the common fission gas plenum. The common plenum may also have better means of processing beyond just storage. This technology is used in the oil and gas industry (such as blowout preventers), among others.

BRIEF DESCRIPTION OF THE DRAWINGS

Various features of the embodiments described herein, together with advantages thereof, may be understood in accordance with the following description taken in conjunction with the accompanying drawings as follows.

DETAILED DESCRIPTION

Figure 1:
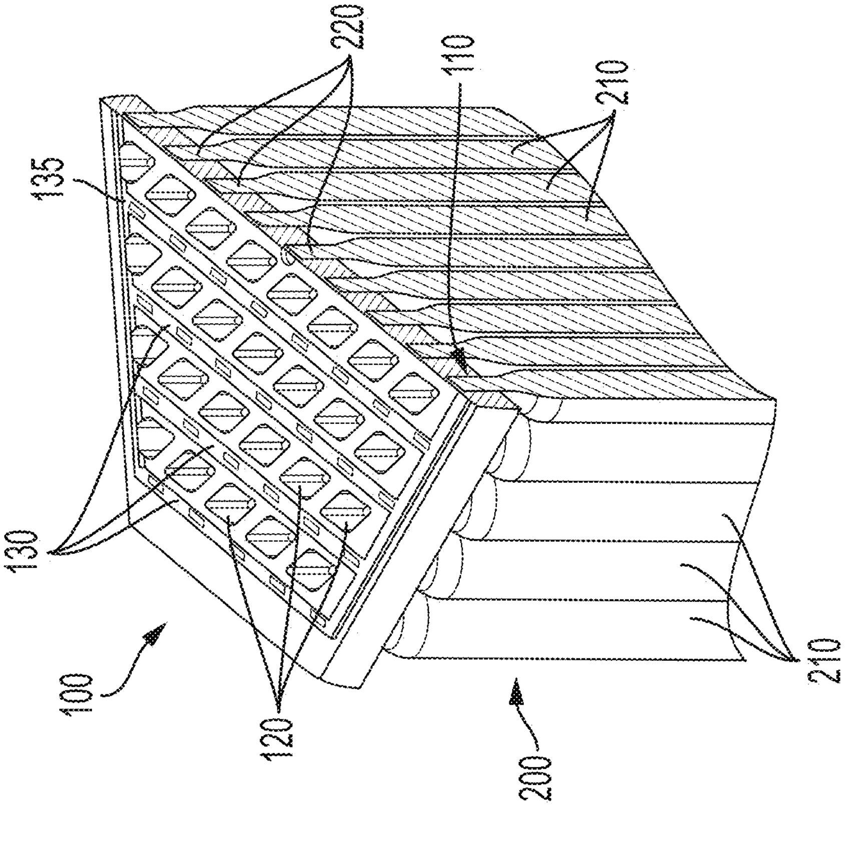
FIG. 1 is a partial cutaway view of an upper end fitting positioned onto a fuel bundle, in accordance with at least one aspect of the present disclosure.
Figure 3:
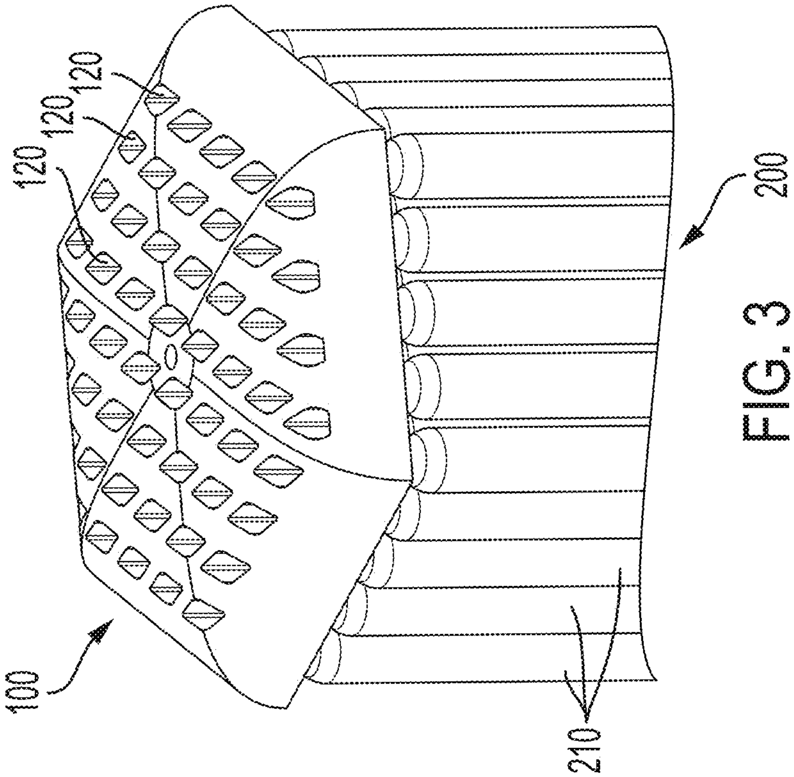
FIG. 3 is a perspective view of the upper end fitting and fuel bundle of FIG. 1.

FIGS. 1 and 3 illustrate an upper end fitting 100, located at the top of an active fuel bundle 200 which includes flow regions for coolant and internal passages for fission gasses. The active fuel bundle 200 and upper end fitting 100 are part of a fuel assembly 500 (see FIG. 5). The nuclear reactor comprises a plurality of fuel assemblies 500 and it should be noted that the reactor is not limited to the number of fuel assemblies 500 depicted in FIG. 5 and that any suitable number of fuel assemblies 500 may be utilized without varying from the intended scope of this disclosure. Specifically, six fuel assemblies 500 are depicted in FIG. 5, however these are only a subset of the fuel assemblies that will be received in a given nuclear reactor during operation.

Figure 5:
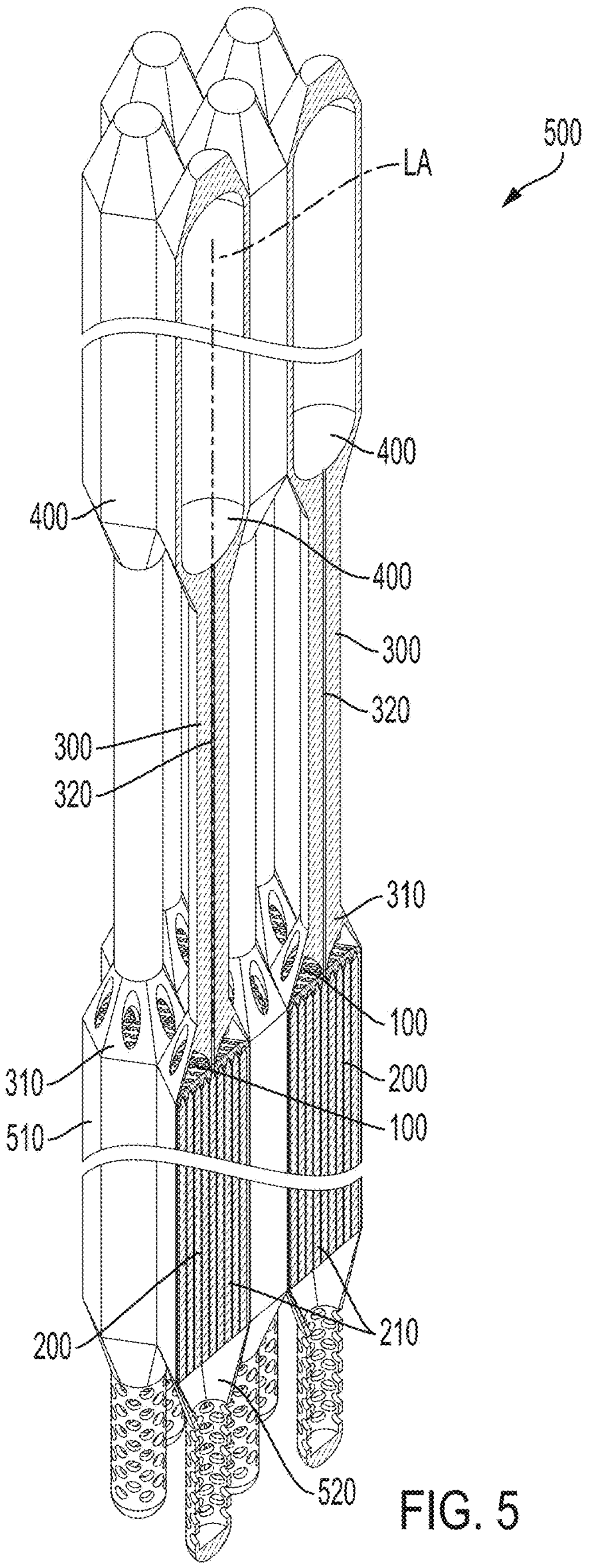
FIG. 5 is a perspective cross sectional view of fuel assemblies with each fuel assembly comprising the upper end fitting and fuel bundle of FIG. 1, in accordance with at least one aspect of the present disclosure.

Referring still to FIG. 5, the fuel assembly 500 comprises an exterior surface wrapper or elongate duct 510 that functions to direct the coolant from the cold end of the reactor past fuel elements, or fuel rods 210, where the nuclear heat is transferred. The coolant exits the duct 510 below a tank, or common fission gas plenum 400 at a higher temperature than at the core inlet. The fuel assembly 500 further comprises a lower end fitting 520 extending from the bottom of the duct 510. The duct 510 is configured to receive the fuel bundle 200 which comprises a plurality of fuel elements or fuel rods 210. Each of the fuel assemblies 500 comprises a first portion and a second portion in fluid communication with each other. The first portion comprises the lower end fitting 520, the fuel bundle 200, and the upper end fitting 100. The second portion comprises the common fission gas plenum 400. The first portion and the second portion of the fuel assembly 500 are held in fluid communication via a mast 300 (i.e., a third portion of the fuel assembly 500) positioned intermediate the first portion and the second portion.

Referring primarily to FIGS. 1-4, the fuel bundle 200 includes the plurality of fuel rods 210 as discussed above. A tapered or necked-down fuel rod section 220 of each fuel rod 210 is received in an opening or plenum flow connection 110 in the upper end fitting 100. In at least one embodiment, the necked-down fuel rod section 220 may include a one-way valve or fluidic diode, for example. In any event, the fuel rods 210 are in one-way fluid communication with the plenum flow connection 110 in the upper end fitting 100. The cladding of each fuel rod 210 is seal welded or otherwise affixed into the plenum flow connection 110 of the upper end fitting 100.

Figure 1A:
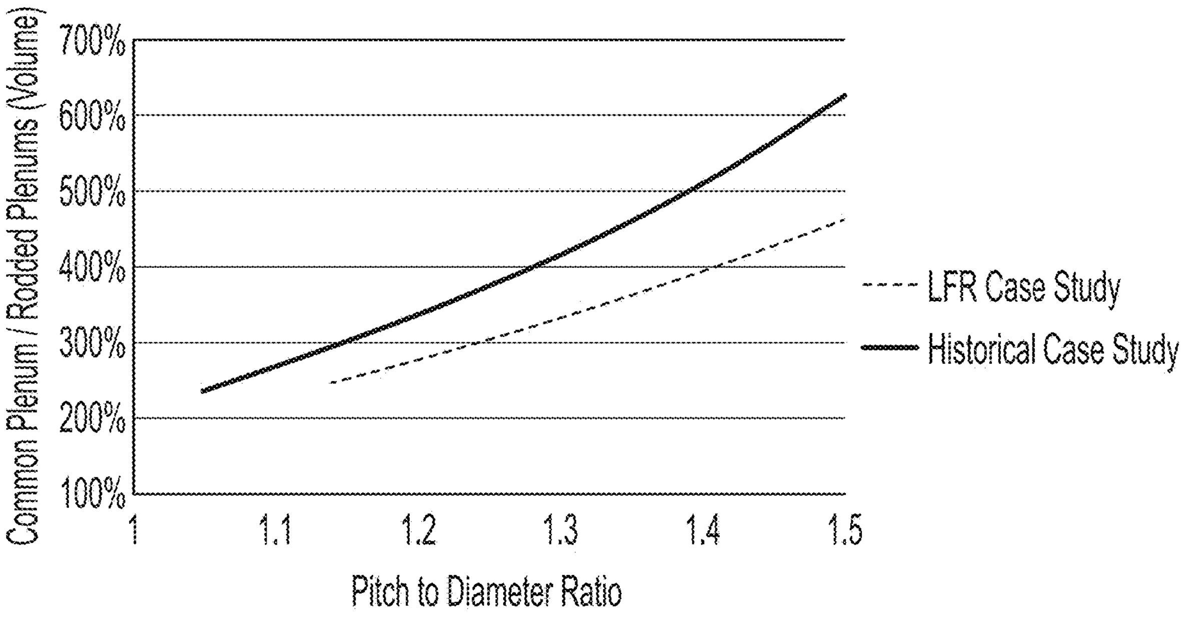
FIG. 1A is a graphical representation depicting the ratio of common fission gas plenum volume in accordance with at least one aspect of the present disclosure to rodded plenum volumes at different pitch to diameter ratios.
Figure 2:
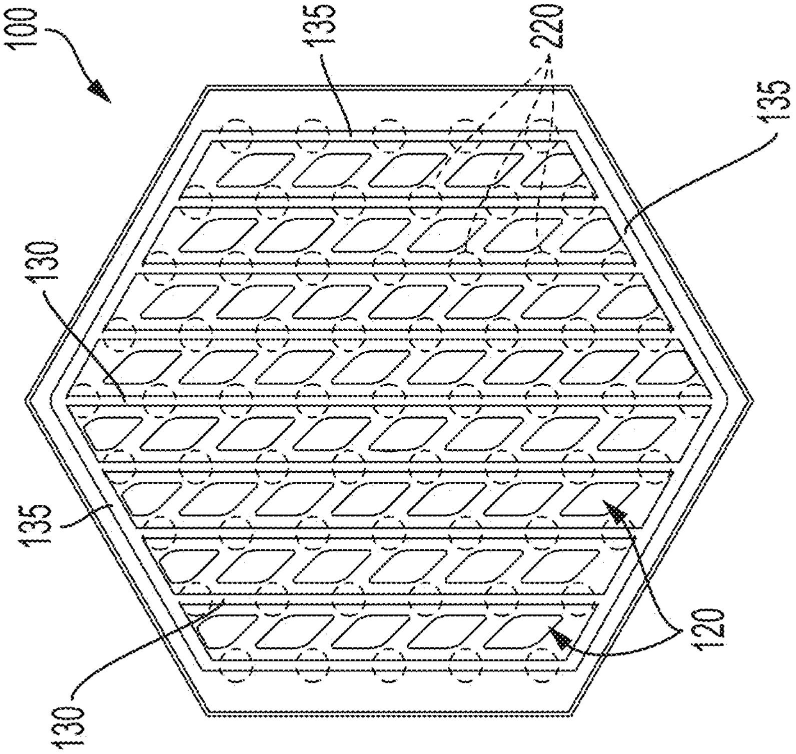
FIG. 2 is a plan view of the upper end fitting and fuel bundle of FIG. 1.
Figure 9:
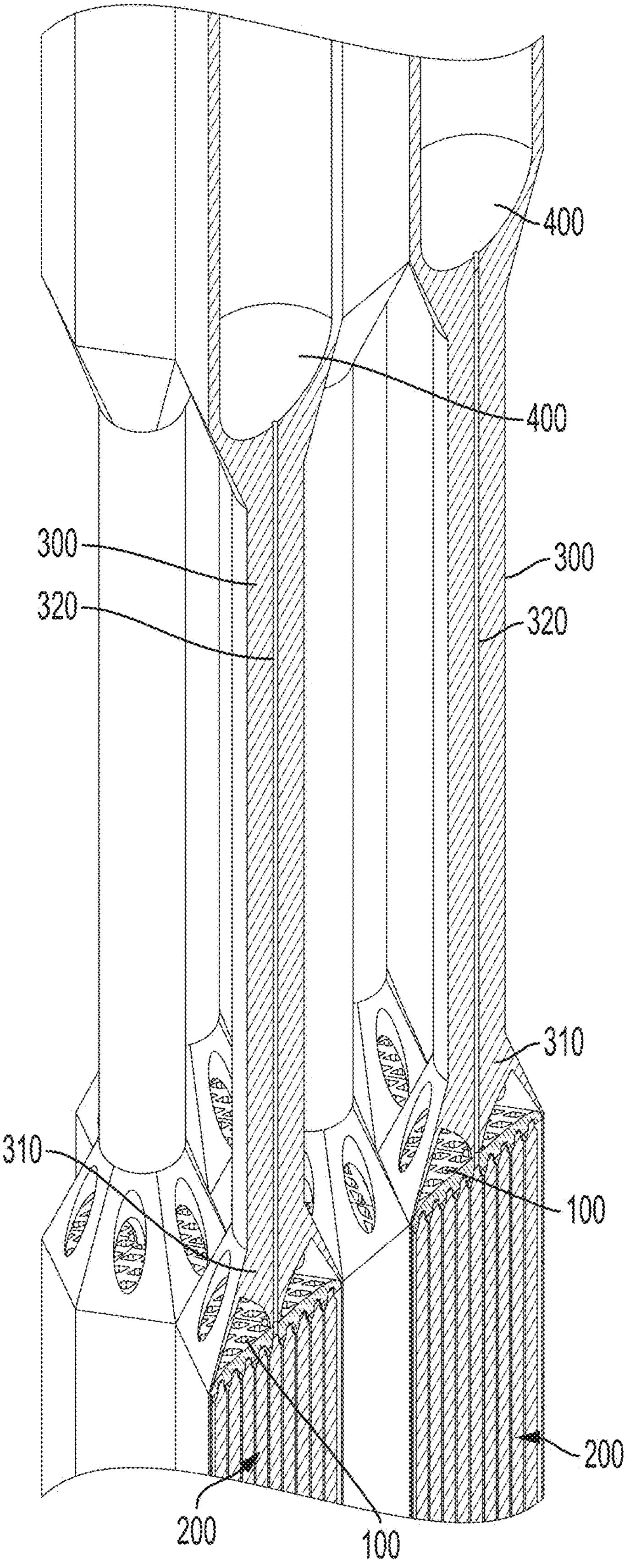
FIG. 9 is another cross sectional view of the fuel assemblies of FIG. 5 depicting a common fission gas plenum or tank extending from the mast portion.

During use, fission gases emitted from the fuel rods 210 escape from the plenum flow connection 110 into channels, capillaries, or flow pathways 130 defined within the upper end fitting 100. The flow pathways 130 are defined in the upper end fitting 100 such that they interconnect (i.e., fluidly connect) each of the plenum flow connections 110 positioned above the fuel rods 210. The flow pathways 130 are defined in the upper end fitting 100 in parallel rows intermediate the plenum flow connections 110 for the fuel rods 210. Flow pathways 130 are interconnected with a perimeter channel, or perimeter flow pathway 135 which is defined in the upper end fitting 100 around the perimeter of the plenum flow connections 110. The perimeter flow pathway 135 forms a hexagon shape as illustrated in FIG. 2. It should be appreciated that different arrays and/or patterns of flow paths positioned intermediate the plenum flow connections 110 and around the perimeter of the plenum flow connections 110 are contemplated. For example, the flow pathways 130 may comprise a crisscross pattern. In any event, the fission gases move through the flow pathways 130, 135 and out of the upper end fitting 100 via a plenum header connection 140 (see FIG. 7) at the center of the upper end fitting 100. In other words, the upper end fitting 100 links each of the fuel rods 210 to a common, central connection point (i.e., the plenum header connection 140). The fission gasses will flow from the plenum header connection 140 through the mast 300, located above the upper end fitting 100, and into the tank, or common fission gas plenum 400 as shown in FIGS. 5 and 9. Other embodiments are envisioned where the upper end fitting 100 links each of the fuel rods 210 to a common collection region within the upper end fitting 100 which is not in the center of the fuel bundle 200.

Figure 6:
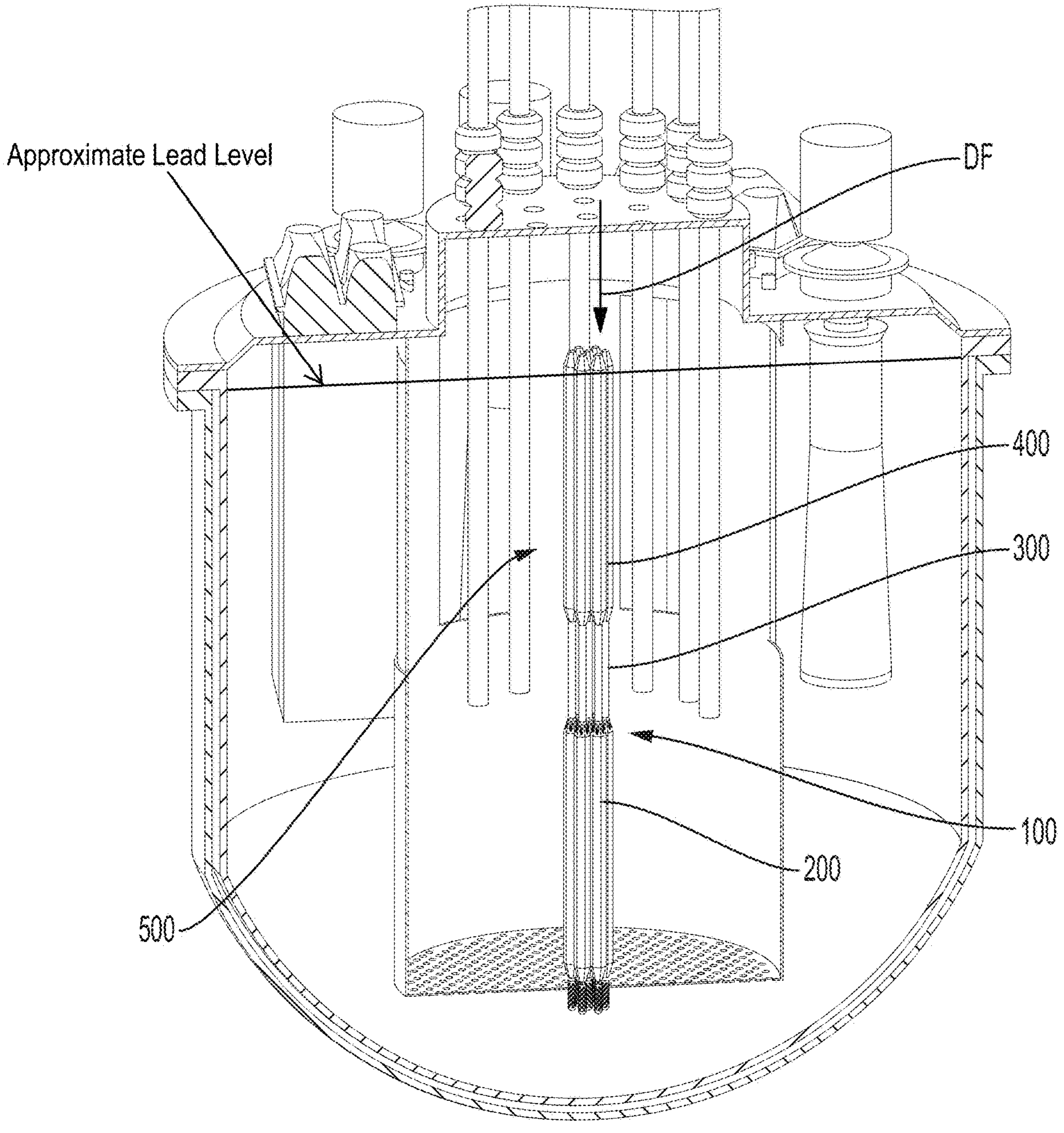
FIG. 6 is a partial perspective view of a nuclear reactor having a vessel, a coolant within the vessel, and a representative quantity of fuel assemblies from FIG. 5 within the coolant, and further showing the downward vertical retention force applied to one exemplary fuel assembly.

Referring again to FIG. 5, the mast 300 comprises outer most surfaces which are defined within an outer diameter that is smaller than the outer diameter that encompasses the outer most surfaces of the fuel bundle 200 and the outer diameter that encompasses the outer most surfaces of the common plenum 400. In other words, the mast 300 is smaller in the width direction (e.g., transverse to a longitudinal axis LA defined by the mast 300) compared to the width of the common fission gas plenum 400 and fuel bundle 200. In view of this, the mast 300 is considered a reduced diameter mast, for example. Further, the mast 300 comprises a pipeline, or passage 320 defined therein that connects the plenum header connection 140 of the upper end fitting 100 to the common plenum 400. The longitudinal axis LA extends along the passage 320 of the mast 300 and defines the central axis of the mast 300. In the illustrated embodiment, only one passage 320 is shown, however other embodiments with more than one passage are contemplated. The flow pathways 130, 135 of the upper end fitting 100, which are in fluid communication with the nuclear fuel material in the fuel rods 210, are also in fluid communication with the common plenum 400 via the passage 320 of the mast 300. In at least one embodiment, the common plenum 400 is located within a region of the nuclear reactor with reduced and/or stagnant coolant flow, thus permitting it to occupy a larger volume compare to a conventional reactor, as illustrated in FIG. 6.

Further to the above, the mast 300 permits reactor coolant flow in the radial direction (i.e., transverse to the longitudinal axis LA) to the heat exchange equipment and the reactor coolant pumps of the nuclear reactor. Specifically, the mast 300 comprises a flow region above the fuel (i.e., within a nozzle 310) in which coolant is free to move out of the fuel bundle 200 and into other parts of the reactor, such as to the primary heat exchangers and/or the reactor coolant pumps. More specifically, the mast 300 comprises the nozzle 310 at its bottom end (i.e., the end of the mast 300 closest to the fuel bundle 200). The nozzle 310 is positioned intermediate the mast 300 and the fuel bundle 200, as illustrated in FIG. 7.

Figure 7:
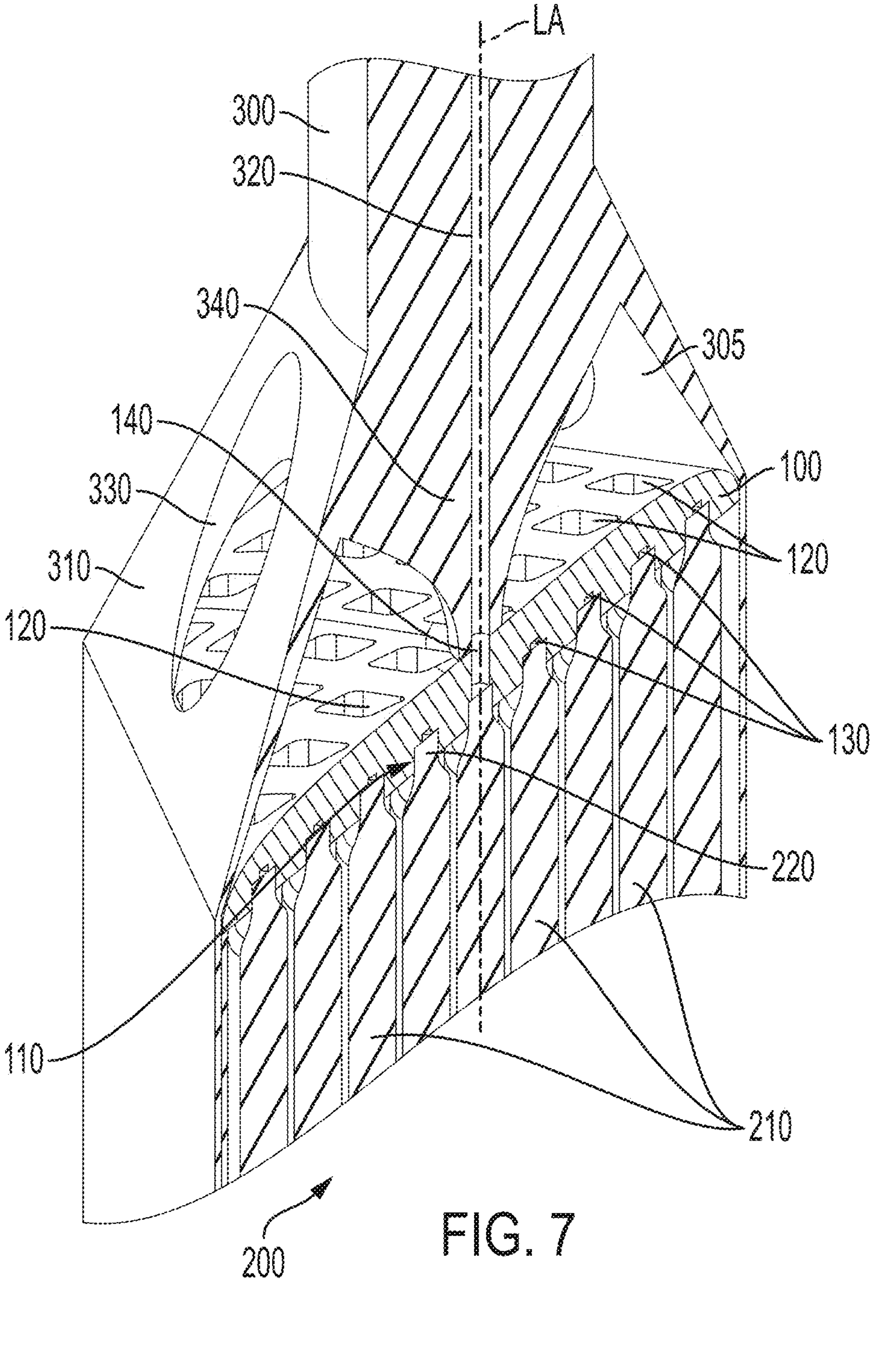
FIG. 7 is a cross sectional perspective view of one of the fuel assemblies of FIG. 5 depicting channels in the upper end fitting in fluid communication with fuel elements of the fuel bundle.
Figure 8:
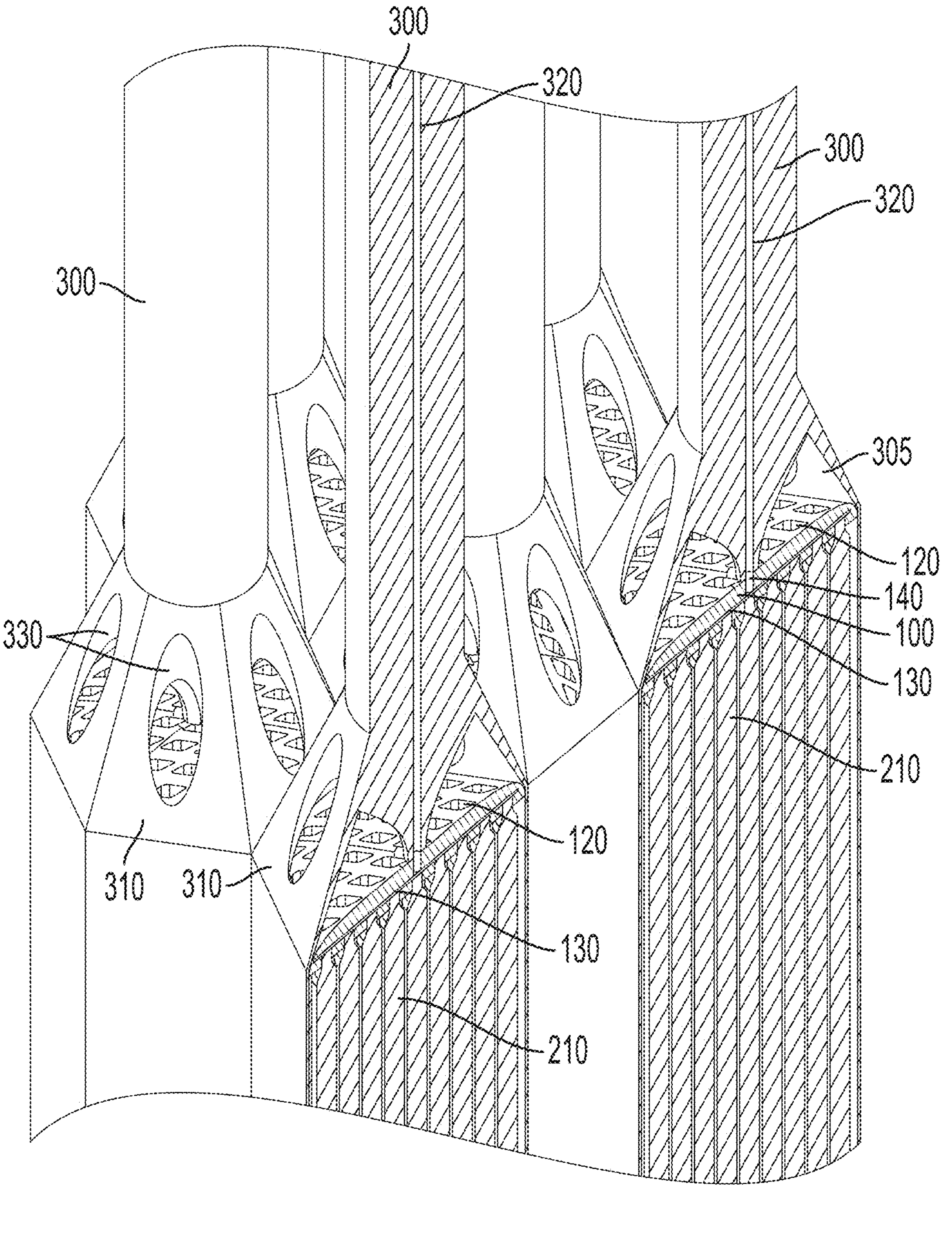
FIG. 8 is another perspective cross sectional view of the fuel assemblies of FIG. 5 depicting the channels in the upper end fitting in fluid communication with a central passage in a mast extending above the fuel bundle.

Referring primarily to FIG. 7, the exterior of the nozzle 310 is conical in shape and tapers from the outer surfaces of the fuel bundle 200 to the mast 300. The nozzle 310 comprises internal cavities 305 which taper from a wider portion closest to the fuel bundle 200 toward a narrower portion closest to the mast 300. The internal cavities 305 provide a region for coolant to flow within after the coolant has exited the fuel bundle 200 and upper end fitting 100, for example. The internal cavities 305 are positioned in the nozzle 310 such that a central conical portion 340 is defined by the internal cavities 305. The central conical portion 340 extends upward from the upper end fitting 100 and comprises a portion of the passage 320 defined therein. The nozzle 310 includes openings, or coolant flow pathways 330 that are radially spaced around the nozzle 310 of the mast 300. In the illustrated embodiment, six coolant flow pathways 330 are defined in the nozzle 310, however any suitable number of coolant flow pathways 330 may be utilized. The coolant flow pathways 330 permit coolant to escape the nozzle 310 after the coolant has passed through openings, or coolant flow channels 120, in the upper end fitting 100, as described in greater detail below.

The upper end fitting 100 may be manufactured in two pieces, with the fission gas flow pathways 130, 135 formed in one of the pieces using means such as machining, milling, etching, and/or any other suitable machining technique. A second piece would then be affixed using diffusion bonding or any suitable method to form a unitary, seamless upper end fitting, such as the upper end fitting 100, for example. Other means for manufacture of the upper end fitting 100 include, but are not limited to, additive manufacturing or investment casting. In at least one embodiment, the upper end fitting 100 is created by combining equally sized radial sections together. The radial sections may be combined via welding, bonding, or any suitable method.

Figure 4:
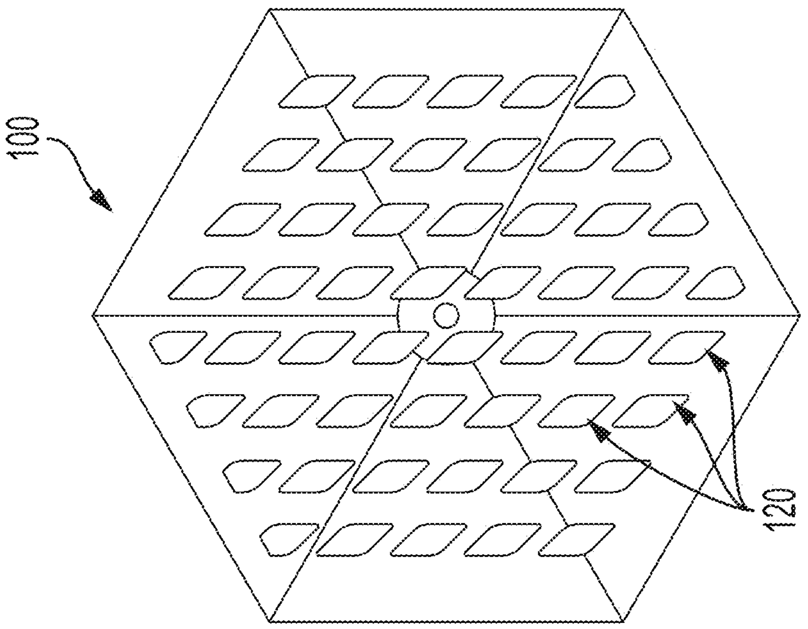
FIG. 4 is a plan view of the upper end fitting of FIG. 1.

Referring primarily to FIGS. 3 and 4, the upper end fitting 100 comprises coolant flow channels 120 that permit coolant to flow therethrough from the region surrounding the fuel bundle 200 (i.e., below the upper end fitting 100) to the region above the upper end fitting 100. In the illustrated embodiment, the coolant flow channels 120 are sized and shaped to occupy the spaces between the fuel rods 210. However, other embodiments are envisioned with different patterns, arrays, shapes, and sizes of coolant flow channels within the upper end fitting 100. In at least one embodiment, the coolant flow channels 120 are large enough to preclude blockage concerns or notably add to the pressure loss relative to a conventional fuel assembly upper nozzle. Design studies to date show >80% of the flow area relative to the rod channels; a value which is competitive with many current fuel nozzles or mixing grids.

As discussed above, defined within the reduced diameter section of the mast 300 are one or multiple fission gas pipelines or passages 320 linking the interior regions of the fuel rods 210 to the common plenum 400. The flow pathways 130, 135 in the upper end fitting 100, the plenum header connection 140 in the upper end fitting 100, the passage 320 in the mast 300, and the common plenum 400 form a gas collection volume that is sized to achieve a significant reduction in plenum pressure through achieving a 200-300% increase in volume relative to the combined plenum area in a traditional fuel assembly. Reduced plenum pressure eases the challenges of high fuel rod clad exposure and also pressurization during fuel heatup transients and fuel movements (e.g., dry lifts, etc.). The passageways, flow paths, and connection(s) to the common plenum 400 may also have a one way valve or valves to prevent back-flow to the transport pipe (e.g., passage 320), should it be damaged. One way valves may be positioned at any point along the fission gas collection volume and/or as part of the fuel rods 210, for example.

With conventional fuel cycles, the power density, higher rod pressure, and necessity for short outages make dry lift refueling (e.g., refueling where spent fuel assemblies are lifted absent their typical coolant, only being cooled by air or some other gas) more challenging. For example, conventional fuel cycles require long in-vessel storage time for used fuel and/or lifting of the fuel together with a certain amount of coolant to enhance cooling; overall complicating reactor design and fuel handling. Specifically, fuel must be moved to a peripheral location within the reactor vessel and then into a coolant-filled lifting container. From here it may be lifted and transferred to a temporary holding location or high-decay heat spent fuel cask. The move to this peripheral location either requires short assemblies, which can be lifted over one another within the reactor's coolant pool (thus requiring expensive ballast or latching for hold-down—specific challenge in lead or other fast reactors), or full-height assemblies which must be shuffled within the vessel in order to make room for moving the to-be-discharged fuel assemblies and allowing the partially-burned assemblies to be put back in place. This shuffling requires a large number of in-vessel storage locations, driving a significant increase in vessel size and reactor internals complexity. The many moves required in this shuffling also increases time and chances of a fuel handling accident.

At least one aspect of the present disclosure has promise to lower power density, rod internal pressure, and outage time pressure (e.g., if refueling happens once or twice during the plant's lifetime, multi-month cooling may be acceptable) such that direct, dry lifts from the fuel location inside the core may be performed into shielded refueling masts (and then into dry casks). This not only simplifies the refueling equipment, but shrinks the vessel and eliminates other refueling infrastructure in the plant.

Referring primarily to FIG. 9, an enlarged cutaway portion of the plurality of fuel assemblies 500 from FIG. 5 arranged side-by-side is illustrated. The upper end fitting 100 and the fuel bundle 200 are situated in the first portion of the fuel assembly 500 within the duct 510 of each fuel assembly 500. The fuel assembly 500 uses a common or shared fission gas plenum 400, relocating the gas plenum from the fuel rods 210 to the common plenum 400 located above the mast 300 in the second portion of the fuel assembly 500, which is in otherwise-unused volume of the vessel above the active fuel and core outlet flow region. The submergence of the fuel far below the coolant surface is necessary for location of the primary heat exchangers in a manner compatible with natural convection. The addition of the common plenum 400 has little to no effect on the overall fuel length while permitting the active core region to be much taller. This permits an increase in active fuel mass of 200% or more relative to a conventional fuel design. Further, the common plenum 400, moved away from the active core region reduces the negative effect of volatile, neutron-absorbing fission products, such as xenon, samarium, gadolinium and others, on core reactivity.

Like some other fast reactor designs, the fuel assembly structure in this concept may penetrate the surface of the coolant, thus greatly easing handling. In at least one embodiment, the common fission gas plenum 400 location takes advantage of the required height to broach the coolant surface, thus advantageously utilizing this extra length and assemblage to ease in identification and capture during refueling as well as hold-down features.

Figure 10:
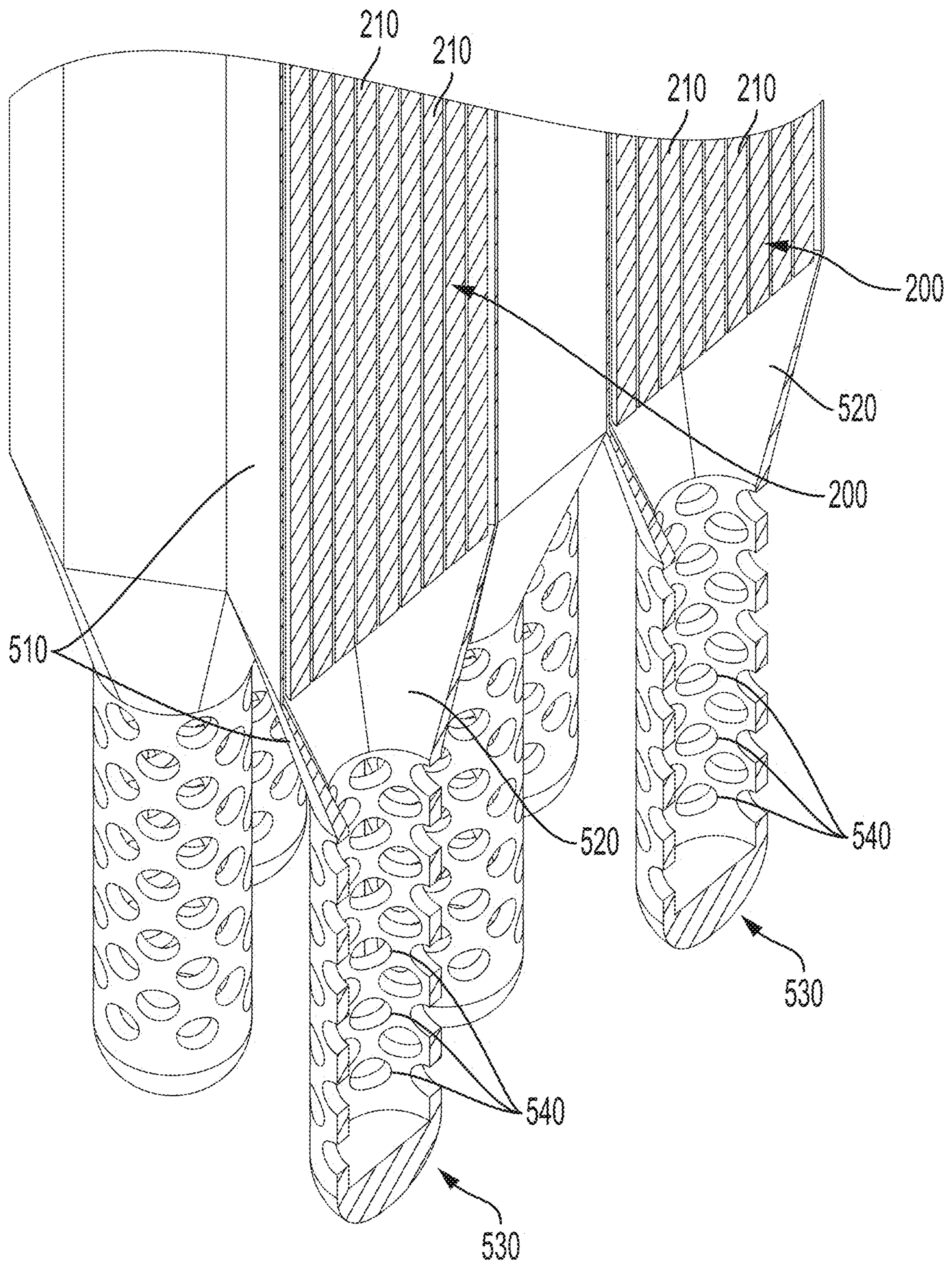
FIG. 10 is another cross sectional view of the fuel assemblies of FIG. 5 depicting the fuel bundles and a bottom extension portion configured to receive coolant.

FIG. 10 illustrates an enlarged cutaway portion of the bottom end of the fuel assemblies 500 of FIG. 5. The fuel bundles 200 comprising the fuel rods 210 are situated in the duct 510 of the fuel assembly 500 (i.e., the first portion of the fuel assembly 500). The lower end fitting 520 of the fuel assembly 500 comprises a bottom extension portion 530 including a plurality of inlet holes 540 for ingress of coolant. The coolant flows into the inlet holes 540, into the lower end fitting 520, around the fuel rods 210 in the fuel bundle 200, through the coolant flow channels 120 of the upper end fitting 100 and out of the coolant flow pathways 330 in the nozzle 310 of the mast 300, for example.

In the case of heavy liquid metal coolants, such as lead or lead-bismuth, a long fuel assembly, such as fuel assembly 500, which rises above the liquid metal, permits easier hold-down of fuel (note, in these coolants where the coolant is denser than the fuel, the fuel is positively buoyant and tends to float) without complicated internals, latches, or expensive ballast. Referring primarily to FIG. 6, arrow DF depicts the downward vertical retention force applied to the fuel assembly, such as fuel assembly 500. Due to the location above the core and core exit flow, fission gases will primarily be in a relatively low temperature region (i.e., relative to in-rod temperatures), thus lowering pressure of the common fission gas plenum at a given released fission gas molar content and fuel exposure.

The common fission gas plenum 400, owing to its location in a large, unused portion of the vessel, has a larger volume than would generally be practical in the fuel rod or in other concepts. Further, it is located away from the highest fluence region, i.e., the core, relative to conventional in-rod fission gas plena, thus lowering fission gas pressure and irradiation damage on the plenum walls; this increases the mechanical margin against failure.

Locating the common fission gas plenum 400 away from the flowing coolant stream, thus reducing the material selection challenges associated with flow-induced corrosion/erosion.

Should a fuel rod 210 develop a leak, fission gas release from the leak would be limited to fission gases produced post-leak. The check valves (or fluidic diodes) in the fuel rods 210 and the inlet of the common plenum 400 would preclude previously-generated (and stored) fission gas in the common plenum 400 from leaking into the reactor coolant system. Further, the check valves (or fluidic diodes) may preclude previously-generated (and stored) fission gas in the passage 320, plenum header connection 140, and/or flow pathways 130, 135 of the upper end fitting 100 from leaking into the reactor coolant system.

At least one aspect of the present disclosure permits monitoring the plenum pressure, which is not practical in conventional designs adopting individual fuel rod plena. Monitoring the common plenum pressure may permit identification of fuel assemblies containing leaking fuel rods.

Reduced pressure, owing to the large plenum tank, may ease concerns surrounding leaking fuel assemblies. Additionally, ability to conceivably conduct controlled venting/collection of common plenum may allow other means to address/mitigate leaking assemblies.

Lowered power density within a given vessel size, lower rod pressure, infrequency of refueling, and ease of fuel handling owing to location above or near the coolant surface may permit dry-lift refueling at each position, greatly easing cost of these systems and plant layout/size. Direct extraction without in-coolant shuffling is a notable simplification relative to many other refueling schemes.

A “cut and pinch” method (e.g., similar to that used in oil rig blowout preventers) of separating the common plenum 400 from the active fuel region (e.g., the fuel bundle 200), which includes the fuel elements 210 and the upper end fitting 100, may be utilized in the reduced diameter mast section 300, i.e., in the third portion of the fuel assembly 500. The “cut and pinch” methodology may ease long term storage of spent fuel or damaged assemblies; both in-vessel and in casks.

Lowered stresses on the fuel rod cladding would facilitate implementation of ultra-long fuel cycles, resulting in reduced need for used fuel infrastructures and reduced concerns on potential diversion of used fuel during refueling operation. These advantages particularly apply to reactors in countries lacking mature fuel cycle infrastructures/safeguards.

At least one aspect of the present disclosure permits a substantial increase in the overall fuel load which can be placed in pool-type reactors, decreases fission gas pressure, and eases refueling challenges in pool type plants employing liquid metal or salt coolants. It does so while providing the possibility to extend refueling intervals to 20 years or longer. This allows a customer to avoid buying refueling equipment intended for frequent use and, as such, being an integral part of the Nuclear Island. This simplifies the overall plant layout, provides guaranteed fuel costs over the entire capitalization period (and longer), reduces the volume of spent fuel generated, increases proliferation resistance, and eases access to markets that would otherwise be challenged by the lack of mature fuel cycle infrastructures/safeguards. Costs savings will result. Other advantages will be apparent.

Various aspects of the subject matter described herein are set out in the following examples.

Example 1—A fuel assembly for use in a nuclear reactor having a vessel and further having coolant situated within the vessel. The fuel assembly comprises a first portion and a second portion. The first portion comprises an elongate duct, a plenum header connection including a plurality of flow pathways formed therein, and a plurality of fuel elements positioned within the elongate duct. Each fuel element comprises a cladding including an interior region formed therein. The interior region comprises nuclear fuel material situated therein. The interior regions of the plurality of fuel elements are in fluid communication with the plurality of flow pathways. The second portion comprises a common fission gas plenum in fluid communication with the plurality of flow pathways of the plenum header connection. The common fission gas plenum is positioned in an otherwise unused portion of the vessel. The common fission gas plenum is configured to receive an amount of fission gas generated by the nuclear fuel material during operation of the nuclear reactor.

Example 2—The fuel assembly of Example 1, wherein the fuel assembly is configured to have a retention force applied thereto to resist at least one of a frictional force, a form drag force, and a buoyant force applied to the fuel assembly by the coolant and to retain the plurality of fuel elements within the coolant.

Example 3—The fuel assembly of Examples 1 or 2, wherein the fuel assembly comprises a third portion positioned intermediate the first portion and the second portion, and wherein the third portion includes a passage that places the first portion and the second portion in fluid communication with one another.

Example 4—The fuel assembly of Example 3, wherein the first portion comprises a first outermost surface defined within a first diameter, wherein the second portion comprises a second outermost surface defined within a second diameter, and wherein the third portion comprises a third outermost surface defined within a third diameter that is smaller than the first diameter.

Example 5—The fuel assembly of Example 4, wherein the third diameter is smaller than the second diameter.

Example 6—The fuel assembly of Examples 3, 4, or 5, wherein at least one of the common fission gas plenum, the passage, the flow pathways, the plenum header connection, and the plurality of fuel elements includes a check valve that resists fission gas from flowing in a direction from the common fission gas plenum toward the plurality of fuel elements.

Example 7—The fuel assembly of Example 6, wherein the check valve comprises a fluidic diode.

Example 8—The fuel assembly of Examples 1, 2, 3, 4, 5, 6, or 7, wherein the plenum header connection comprises a plurality of coolant flow channels defined therein.

Example 9—The fuel assembly of Examples 3, 4, 5, 6, or 7, wherein the plenum header connection further comprises a central collection passage configured to fluidly connect the plurality of flow pathways of the plenum header connection to the passage of the third portion.

Example 10—A fuel assembly for use in a nuclear reactor having a vessel and further having a coolant situated within the vessel. The fuel assembly comprises a fuel bundle, a plenum header connection, an elongate mast, and a common fission gas plenum. The fuel bundle comprises a plurality of fuel elements. Each fuel element comprises nuclear fuel material positioned therein. The plenum header connection comprises a plurality of passageways defined therein. The plenum header connection is positioned on the fuel bundle. The plurality of passageways are in fluid communication with the nuclear fuel material. The elongate mast extends from the fuel bundle and comprises an internal passage. The common fission gas plenum extends from the elongate mast. The internal passage connects the common fission gas plenum to the plurality of passageways of the plenum header connection such that the common fission gas plenum is configured to receive an amount of fission gas generated by the nuclear fuel material during operation of the nuclear reactor. The common fission gas plenum is positioned in an otherwise unused portion of the vessel.

Example 11—The fuel assembly of Example 10, wherein the fuel assembly is configured to have a retention force applied thereto to resist at least one of a frictional force, a form drag force, and a buoyant force applied to the fuel assembly by the coolant and to retain the plurality of fuel elements situated within the coolant.

Example 12—The fuel assembly of Examples 10 or 11, wherein the fuel bundle comprises a first outermost surface defined within a first diameter, wherein the common fission gas plenum comprises a second outermost surface defined within a second diameter, and wherein the elongate mast comprises a third outermost surface defined within a third diameter that is smaller than the first diameter.

Example 13—The fuel assembly of Example 12, wherein the third diameter is smaller than the second diameter.

Example 14—The fuel assembly of Examples 10, 11, 12, or 13, wherein at least one of the common fission gas plenum, the internal passage, the passageways, the plenum header connection, and the plurality of fuel elements includes a check valve that resists fission gas from flowing in a direction from the common fission gas plenum toward the plurality of fuel elements.

Example 15—The fuel assembly of Example 14, wherein the check valve comprises a fluidic diode.

Example 16—The fuel assembly of Examples 10, 11, 12, 13, 14, or 15, wherein the plenum header connection further comprises a central collection passage, and wherein the central collection passage fluidly connects the plurality of passageways of the plenum header connection to the internal passage of the elongate mast.

Example 17—A method of forming a fission gas plenum header connection for use with a fuel assembly in a nuclear reactor. The fuel assembly includes a plurality of fuel elements. The method comprises the step of forming flow channels by machining, etching, or otherwise removing material in a first portion, and diffusion bonding a second portion to the first portion to form a unitary, seamless plenum header connection comprising internal flow channels configured to permit fission gas emitted from the fuel assembly during service to travel therein.

Example 18—The method of Example 17, further comprising the step of machining, etching, or otherwise removing material from the unitary, seamless plenum header connection to form a plurality of plenum flow connections therein, wherein each plenum flow connection is configured to receive an end of one of the fuel elements of the fuel assembly.

Example 19—The method of Example 18, wherein the internal flow channels interconnect with the plurality of plenum flow connections such that the internal flow channels and the plurality of plenum flow connections are in fluid communication with one another.

Example 20—The method of Examples 18 or 19, further comprising the step of machining, etching, or otherwise removing material from the plenum header connection to form flow channels for coolant of the nuclear reactor.

While specific embodiments have been described in detail, it will be appreciated by those skilled in the art that various modifications and alternatives to those details could be developed in light of the overall teachings of the disclosure and that selected elements of one or more of the example embodiments may be combined with one or more elements from other embodiments without varying from the scope of the disclosed concepts. Accordingly, the particular embodiments disclosed are meant to be illustrative only and not limiting as to the scope of the present disclosure which is to be given the full breadth of the appended claims and any and all equivalents thereof.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms “comprise” (and any form of comprise, such as “comprises” and “comprising”), “have” (and any form of have, such as “has” and “having”), “include” (and any form of include, such as “includes” and “including”) and “contain” (and any form of contain, such as “contains” and “containing”) are open-ended linking verbs. As a result, a system that “comprises,” “has,” “includes” or “contains” one or more elements possesses those one or more elements, but is not limited to possessing only those one or more elements. Likewise, an element of a system, device, or apparatus that “comprises,” “has,” “includes” or “contains” one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A fuel assembly for use in a nuclear reactor, the nuclear reactor having a vessel and coolant situated within the vessel, wherein the fuel assembly defines a longitudinal axis, a first end, and a second end, wherein the second end is positioned above the first end when the fuel assembly is located within the nuclear reactor, and wherein the fuel assembly comprises:

- a first portion positioned adjacent the first end, the first portion comprising:
  - an elongate duct configured to permit the coolant to pass therethrough;
  - a plurality of fuel elements positioned within the elongate duct, wherein each fuel element comprises nuclear fuel material situated therein; and
  - an upper end fitting comprising a plurality of gas flow pathways formed therein and a plenum header connection in fluid communication with the gas flow pathways, the upper end fitting positioned above the plurality of fuel elements, wherein the nuclear fuel material of the plurality of fuel elements is in fluid communication with the plurality of gas flow pathways; and
- a second portion positioned adjacent the second end, the second portion comprising a fission gas storage tank in fluid communication with the plurality of gas flow pathways and the plenum header connection of the upper end fitting, wherein the fission gas storage tank is configured to store an amount of fission gas generated by the nuclear fuel material during operation of the nuclear reactor, and wherein the fission gas storage tank penetrates a top most surface of the coolant such that a first portion of the fission gas storage tank is positioned above the top most surface of the coolant and a second portion of the fission gas storage tank is positioned below the top most surface of the coolant; and
- a plurality of coolant outlets for directing the entirety of the flow of coolant out of the fuel assembly below the fission gas storage tank, wherein the coolant outlets are longitudinally positioned between the fission gas storage tank and the upper end fitting.

2. The fuel assembly of claim 1, wherein the fuel assembly comprises a third portion positioned intermediate the first portion of the fuel assembly and the second portion of the fuel assembly, and wherein the third portion of the fuel assembly includes a passage that places the first portion of the fuel assembly and the second portion of the fuel assembly in fluid communication with one another.

3. The fuel assembly of claim 2, wherein the first portion of the fuel assembly comprises a first outermost surface defined within a first diameter, wherein the second portion of the fuel assembly comprises a second outermost surface defined within a second diameter, and wherein the third portion of the fuel assembly comprises a third outermost surface defined within a third diameter that is smaller than the first diameter.

4. The fuel assembly of claim 3, wherein the third diameter is smaller than the second diameter.

5. The fuel assembly of claim 2, wherein the plenum header connection is configured to fluidly connect the plurality of gas flow pathways of the upper end fitting to the passage of the third portion of the fuel assembly.

6. The fuel assembly of claim 1, wherein the upper end fitting comprises a plurality of coolant flow channels defined therein, the coolant flow channels permit the coolant situated within the vessel to flow therethrough.

7. The fuel assembly of claim 1, wherein the upper end fitting comprises a plurality of plenum flow connection openings defined therein, and wherein the plurality of fuel elements are in one-way fluid communication with the plurality of plenum flow connection openings of the upper end fitting.

8. The fuel assembly of claim 1, further comprising a pipe defining an internal passage, wherein the internal passage places the fission gas storage tank and the upper end fitting in fluid communication with each other, and wherein the pipe defines a longitudinal centerline axis that is coincident with the longitudinal axis defined by the fuel assembly.

9. The fuel assembly of claim 1, wherein the fuel assembly defines an internal passage that places the plenum header connection and the fission gas storage tank in fluid communication with each other, and wherein the internal passage defines an inner diameter that is smaller than an inner diameter defined by the fission gas storage tank.

10. The fuel assembly of claim 1, wherein the fuel assembly defines an internal passage that places the plenum header connection and the fission gas storage tank in fluid communication with each other, and wherein the fission gas storage tank is in one-way fluid communication with the internal passage such that the amount of fission gas stored in the fission gas storage tank is prevented from back-flowing into the internal passage.

11. The fuel assembly of claim 1, wherein a longitudinal centerline axis defined by the plenum header connection is coincident with the longitudinal axis defined by the fuel assembly.

12. A fuel assembly for use in a nuclear reactor, the nuclear reactor having a vessel and coolant situated within the vessel, wherein the fuel assembly defines a longitudinal axis, a first end, and a second end, wherein the second end is positioned above the first end when the fuel assembly is located within the nuclear reactor, and wherein the fuel assembly comprises:

a first portion positioned adjacent the first end, the first portion comprising:

an elongate duct configured to permit the coolant to pass therethrough;

a plurality of fuel elements positioned within the elongate duct, wherein each fuel element comprises nuclear fuel material situated therein; and an upper end fitting comprising a plurality of gas flow pathways formed therein and a plenum header connection in fluid communication with the gas flow pathways, the upper end fitting positioned above the plurality of fuel elements, wherein the nuclear fuel material of the plurality of fuel elements is in fluid communication with the plurality of gas flow pathways; and a second portion positioned adjacent the second end, the second portion comprising a fission gas storage tank in fluid communication with the plurality of gas flow pathways and the plenum header connection of the upper end fitting, wherein the fission gas storage tank is configured to store an amount of fission gas generated by the nuclear fuel material during operation of the nuclear reactor, and wherein a first portion of the fission gas storage tank is positioned above a top most surface of the coolant and a second portion of the fission gas storage tank is positioned below the top most surface of the coolant.

13. The fuel assembly of claim 12, wherein the fuel assembly comprises a transport pipe positioned intermediate the first portion of the fuel assembly and the second portion of the fuel assembly, the transport pipe defining an internal passage, wherein the internal passage places the fission gas storage tank and the plenum header connection in fluid communication with one another, and wherein the transport pipe defines a longitudinal centerline axis that is coincident with the longitudinal axis defined by the fuel assembly.

14. The fuel assembly of claim 13, wherein the first portion of the fuel assembly comprises a first outermost surface defined within a first diameter, wherein the second portion of the fuel assembly comprises a second outermost surface defined within a second diameter, and wherein the transport pipe of the fuel assembly comprises a third outermost surface defined within a third diameter that is smaller than the first diameter.

15. The fuel assembly of claim 14, wherein the third diameter is smaller than the second diameter.

16. The fuel assembly of claim 13, wherein the plenum header connection is configured to fluidly connect the plurality of gas flow pathways of the upper end fitting to the passage of the transport pipe of the fuel assembly.

17. The fuel assembly of claim 12, wherein the upper end fitting comprises a plurality of coolant flow channels defined therein, the coolant flow channels permit the coolant situated within the vessel to flow therethrough.

18. The fuel assembly of claim 12, wherein the upper end fitting comprises a plurality of plenum flow connection openings defined therein, and wherein the plurality of fuel elements are in one-way fluid communication with the plurality of plenum flow connection openings of the upper end fitting.

19. The fuel assembly of claim 12, wherein the fuel assembly defines an internal passage that places the plenum header connection and the fission gas storage tank in fluid communication with each other, and wherein the internal passage defines an inner diameter that is smaller than an inner diameter defined by the fission gas storage tank.

20. The fuel assembly of claim 12, wherein the fuel assembly defines an internal passage that places the plenum header connection and the fission gas storage tank in fluid communication with each other, and wherein the fission gas storage tank is in one-way fluid communication with the internal passage such that the amount of fission gas stored in the fission gas storage tank is prevented from back-flowing into the internal passage.

21. The fuel assembly of claim 12, wherein a longitudinal centerline axis defined by the plenum header connection is coincident with the longitudinal axis defined by the fuel assembly.

* * * * *